(12) United States Patent
Hoefler et al.

(10) Patent No.: US 10,892,510 B2
(45) Date of Patent: Jan. 12, 2021

(54) METHOD FOR PRODUCING AN ENERGY SUPPLY UNIT

(71) Applicant: Bayerische Motoren Werke Aktiengesellschaft, Munich (DE)

(72) Inventors: Thomas Hoefler, Groebenzell (DE); Paul Eitzenberger, Frankfurt am Main (DE); Martin Moser, Munich (DE); Lukas Wittchen, Neuried (DE); Stefan Haase, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 317 days.

(21) Appl. No.: 16/007,068

(22) Filed: Jun. 13, 2018

(65) Prior Publication Data
US 2018/0294503 A1     Oct. 11, 2018

Related U.S. Application Data

(63) Continuation of application No. PCT/EP2016/076393, filed on Nov. 2, 2016.

(30) Foreign Application Priority Data

Dec. 16, 2015   (DE) .................. 10 2015 225 351

(51) Int. Cl.
*H01M 8/248*    (2016.01)
*H01G 11/12*    (2013.01)
(Continued)

(52) U.S. Cl.
CPC ............. *H01M 8/248* (2013.01); *B60L 50/64* (2019.02); *B60L 50/72* (2019.02); *H01G 11/12* (2013.01);
(Continued)

(58) Field of Classification Search
CPC .............. H01M 8/248; H01M 8/2475; H01M 10/0481; H01G 11/78; H01G 11/82
See application file for complete search history.

(56) References Cited

U.S. PATENT DOCUMENTS

| 6,720,101 | B1 | 4/2004 | Dong et al. |
| 2006/0093890 | A1 | 5/2006 | Steinbroner |

(Continued)

FOREIGN PATENT DOCUMENTS

| DE | 10 2012 018 036 A1 | 3/2014 |
| DE | 11 2012 002 733 T5 | 3/2014 |

(Continued)

OTHER PUBLICATIONS

International Search Report (PCT/ISA/210) issued in PCT Application No. PCT/EP2016/076393 dated Feb. 2, 2017 with English translation (six (6) pages).

(Continued)

*Primary Examiner* — Stephan J Essex
(74) *Attorney, Agent, or Firm* — Crowell & Moring LLP

(57) ABSTRACT

A method is provided for producing an energy supply unit for a vehicle having a housing and a stack, realized as a fuel-cell stack, battery stack or capacitor stack, arranged in the housing. The method includes providing the housing, including first and second tie-rod plates and first and second pressure-plate arrangements, wherein each pressure-plate arrangement is fastened to each tie-rod plate, arranging the stack between the two tie-rod plates and between the two pressure-plate arrangements, applying a bracing force to the two pressure-plate arrangements for the purpose of bracing the stack, and fastening at least the first pressure-plate arrangement to both tie-rod plates while the bracing force is being maintained upon the two pressure-plate arrangements. At least one pressure-plate arrangement includes a tolerance compensation system including an end plate securely con- (Continued)

nected to the tie-rod plates, a contact-pressure plate arranged between the end plate and the stack, and a positioning arrangement.

20 Claims, 6 Drawing Sheets

(51) Int. Cl.
| | | |
|---|---|---|
| *H01G 11/82* | (2013.01) | |
| *H01M 2/10* | (2006.01) | |
| *H01M 10/04* | (2006.01) | |
| *H01M 8/2475* | (2016.01) | |
| *H01G 11/78* | (2013.01) | |
| *B60L 50/64* | (2019.01) | |
| *H01G 11/84* | (2013.01) | |
| *B60L 50/72* | (2019.01) | |

(52) U.S. Cl.
CPC ............ *H01G 11/78* (2013.01); *H01G 11/82* (2013.01); *H01G 11/84* (2013.01); *H01M 2/1072* (2013.01); *H01M 2/1077* (2013.01); *H01M 8/2475* (2013.01); *H01M 10/0481* (2013.01); *H01M 2220/20* (2013.01); *H01M 2250/20* (2013.01); *Y02T 90/40* (2013.01)

(56) References Cited

U.S. PATENT DOCUMENTS

2011/0097644 A1* 4/2011 Kinoshita ........... H01M 8/0202
429/483
2012/0264032 A1 10/2012 Watanabe et al.
2014/0147769 A1 5/2014 Takeyama

FOREIGN PATENT DOCUMENTS

| DE | 102012018036 A1 * | 3/2014 | ......... H01M 2/1077 |
| DE | 11 2010 006 034 B4 | 5/2014 | |
| DE | 103 92 581 B4 | 7/2014 | |
| JP | 2009026547 A * | 2/2009 | |

OTHER PUBLICATIONS

German Written Opinion (PCT/ISA/237) issued in PCT Application No. PCT/EP2016/076393 dated Feb. 2, 2017 (seven (7) pages).
German-language Search Report issued in counterpart German Application No. 10 2015 225 351.1 dated Jul. 15, 2016 with partial English translation (thirteen (13) pages).

* cited by examiner

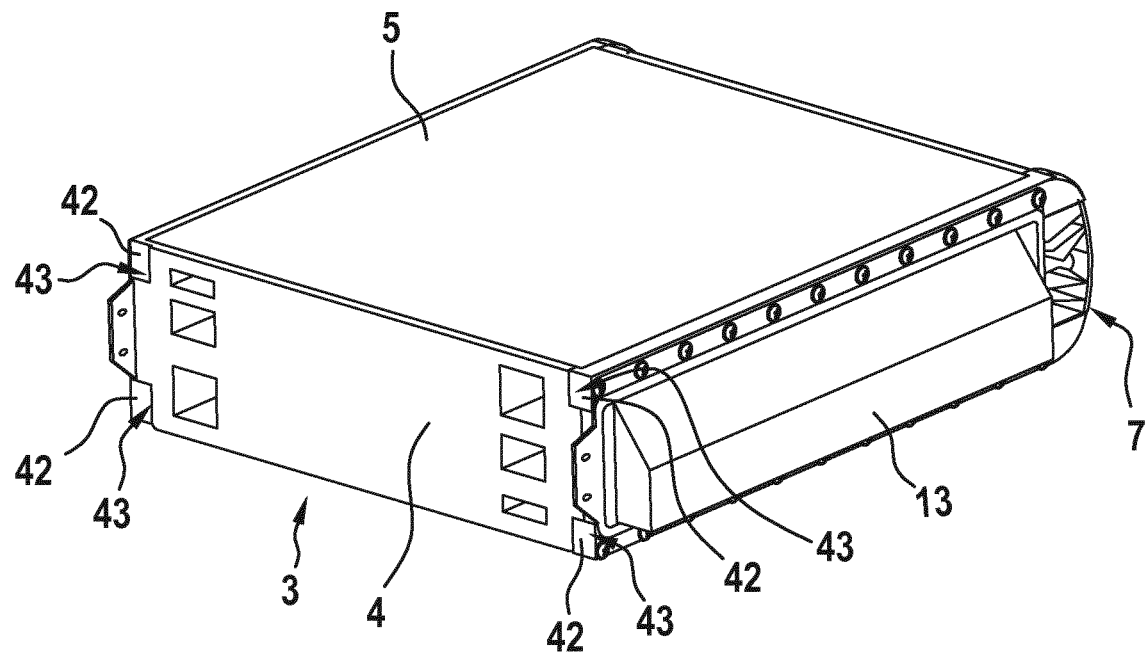
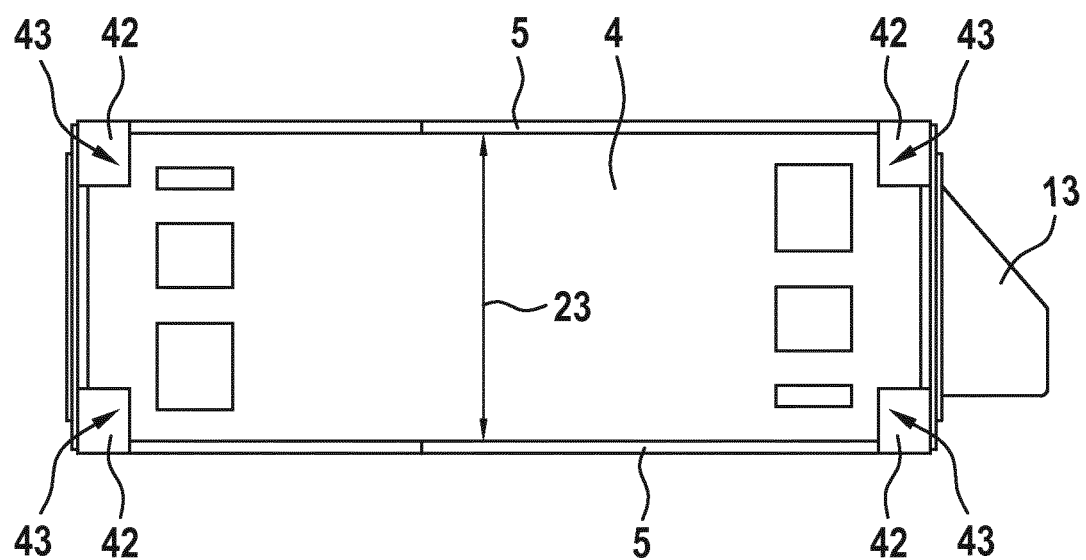
Fig. 4

METHOD FOR PRODUCING AN ENERGY SUPPLY UNIT

CROSS REFERENCE TO RELATED APPLICATIONS

This application is a continuation of PCT International Application No. PCT/EP2016/076393, filed Nov. 2, 2016, which claims priority under 35 U.S.C. § 119 from German Patent Application No. 10 2015 225 351.1, filed Dec. 16, 2015, the entire disclosures of which are herein expressly incorporated by reference.

BACKGROUND AND SUMMARY OF THE INVENTION

The present invention relates to a method for producing an energy supply unit. The energy supply unit comprises a housing having a stack arranged therein. The stack is realized as a fuel-cell stack, battery stack or capacitor stack. The energy supply unit is used, in particular, in a vehicle.

Fuel-cells stacks usually have a plurality of bipolar plates stacked on one another. The bipolar plates, in particular for polymer-membrane fuel cells, must be braced under pressure in order to ensure over the corresponding service life the electrical contacting and sealing of media (hydrogen, air and coolant) among one another and outwardly. Furthermore, the fuel-cell stack must be protected against environmental influences, and uncontrolled emergence of hydrogen must be prevented. High-voltage safety must be ensured during operation and in the event of an accident.

In addition, battery stacks are also considered here. In the case of the battery stack, a plurality of electrochemical cells are stacked on one another. The battery stack realized as a lithium-ion accumulator, for example, must also be braced under pressure in order to ensure the function over the service life.

Usually, for the purpose of bracing the corresponding stack, pressure plates are arranged at both ends. The pressure plates are joined together by tie rods. The tie rods are realized, for example, as threaded rods, tightening straps or metal strips. The unit composed of tie rods, pressure plates and stack is usually arranged in a media-tight, electrically insulated housing. The pressure plates may also be supported on an "outer" housing, such that the longitudinal sides of the housing serve as tie rods. In this case, it is necessary for the sides of the housing that face toward the fuel-cell stack to be realized so as to be very flexurally stiff, and an "inner" pressure plate may be necessary on a fuel-cell stack side, in order to transfer the bracing force of the housing to the fuel-cell stack.

It is an object of the present invention to specify a method that enables the production of an inexpensive, easily constructed and safe energy supply unit, preferably for a motor vehicle. Furthermore, it is an object of the present invention to specify a corresponding energy supply unit. An energy supply unit in this context is understood to mean an energy and power storage device, and energy converter.

The object is achieved by the features of the independent claims. The dependent claims provide advantageous designs of the invention.

The object is thus achieved by a method for producing an energy supply unit. The energy supply unit is advantageously used in a vehicle. In the vehicle, the energy supply unit preferably serves to supply electricity to an electric drive of the vehicle. The energy supply unit disclosed here includes a housing and a stack arranged in the housing. The stack is realized either as a fuel-cell stack, battery stack or capacitor stack having a plurality of capacitor elements.

The housing includes four essential component parts: two opposing tie-rod plates and two opposing pressure-plate arrangements. At least four sides of the housing are realized, at least partially, by the two tie-rod plates and the two pressure-plate arrangements. For this purpose, the energy supply unit is advantageously of a rectangular design. The two remaining longitudinal sides are closed, in particular, by covers.

The stack is arranged between the two tie-rod plates and between the two pressure-plate arrangements. The two pressure-plate arrangements each face with their inner side toward the stack. As already described, the individual elements of the stack (bipolar plates, electrode-membrane units and gas diffusion and contacting media of the fuel cell, or electromechanical elements of the battery or battery cells or of a capacitor) are braced against one another. As a result of this bracing, a force acts upon the pressure-plate arrangements, by which the two pressure-plate arrangements are forced away outward. The two tie-rod plates are used to absorb this force. In the context of the invention, it may preferably be provided in this case that the tie-rod plates fulfill not only the conventional function of a tie rod, but at the same time form at least two sides of the housing. For this reason, preferably, here it is possible to use, not conventional tie rods, but plate-type elements that cover a substantial part of the stack. It is preferably provided that there are no conventional tie rods inside the housing.

The individual elements of the stack, in particular of the fuel-cell stack, have differing heights in the stack direction. These are due to the production tolerance, e.g., of the gas diffusion layers. The concept allows the force upon the stack to be ensured in all tolerance cases, in that the overlapping of the tensile elements with the pressure plate can be adapted in the case of each stack. The connection (e.g., by welding) is then performed according to the position and is individual for each stack.

In addition, the tie-rod plates may also serve as a lateral support of the stack elements (fuel cells, battery cells, capacitors). A force can be exerted upon the stack, at least temporarily, by the tie-rod plates.

It is important, for use of the tie-rod plates as a housing constituent part, on the one hand, and as tie rods, on the other hand, that the stack is held under tension during the fastening of the tie-rod plates to the pressure-plate arrangements. For this purpose, the following method sequence is provided:

First, the stack is arranged between the two tie-rod plates and between the two pressure-plate arrangements. A bracing force is thereupon applied to the two pressure-plate arrangements. The two pressure-plate arrangements are thus pressed against the stack, in order thus to brace the stack.

While the bracing force, generated by an external device, is being maintained upon the two pressure-plate arrangements, and thus upon the stack, the first pressure-plate arrangement is fastened to the two tie-rod plates.

For the connection between the second pressure-plate arrangement and the two tie-rod plates, there are two different possibilities. According to a first possibility, the second pressure-plate arrangement can already be connected to both tie-rod plates before the bracing force is applied. According to a second possibility, the second pressure-plate arrangement is fastened to both tie-rod plates while the bracing force is being maintained upon the two pressure-plate arrangements. Yet a third possibility is also provided, in which the second pressure-plate arrangement is produced so as to be integral with the two tie-rod plates, i.e., so as to constitute a single piece therewith. Furthermore, it is possible for the tie-rod plates to enclose the longitudinal sides. Preferably, the tie-rod plates may also only partially cover their side of the housing, and the additional housing elements can then cover the free surfaces on the tie-rod side.

As soon as both tie-rod plates are securely connected to both pressure-plate arrangements, application of the bracing force can be stopped. From this time-point onward, the two tie-rod plates hold the pressure-plate arrangements and the stack under tension.

At least one pressure-plate arrangement comprises a tolerance compensation system. The tolerance compensation system comprises an end plate, which is usually securely connected to the tie-rod plate, a contact-pressure plate arranged between the end plate and the stack, and a positioning arrangement. A distance between the end plate and the contact-pressure plate is altered by actuating the positioning arrangement.

It is preferably provided that the first pressure-plate arrangement is materially bonded to the two tie-rod plates. This materially bonded connection is effected while the bracing force is being maintained upon the two pressure-plate arrangements. In particular, a welded connection is selected for the materially bonded connection. As an alternative to the welded connection, an adhesive-bonded connection may also be selected, in particular if the pressure-plate arrangement and/or the corresponding tie-rod plate is made from plastic.

On the stack, a stack width is defined parallel to the pressure-plate arrangements. The materially bonded connections between the first pressure-plate arrangement and the two tie-rod plates extend over a seam length. It is preferably provided that the seam length is at least 50%, preferably at least 70%, particularly preferably at least 80%, of the stack width. The seam length is thus made as long as possible, in order on the one hand to achieve a secure connection between the tie-rod plate and the pressure-plate arrangement, and on the other hand to close the housing in a media-tight manner at this point. Possible structural designs, for example, with connection elements at the edges of the housing, may have the result that the seam length cannot be realized over 100% of the stack width of the stack.

It is also provided that at least one the two pressure plates is separably connected to the tie-rod plates.

In particular, the materially bonded connection is also provided for the fastenings of the second pressure-plate arrangement to the two tie-rod plates. The seam length, in turn, as described above, is made as long as possible.

Preferably, the housing is wrapped in a fiber-reinforced plastic. This wrapping is effected, in particular, after the two pressure-plate arrangements have been securely connected to the two tie-rod plates. The wrapping in this case extends around both tie-rod plates and both pressure-plate arrangements.

The majority of the fibers in the wrapping preferably extend in the longitudinal direction, i.e., from one pressure-plate arrangement to the other. The fibers thereby support the tie-rod plates in their function as tie rods. The use of the angle enables the tie-rod plates to be of a relatively light design.

Endless fiber strips or corresponding fabric bands, in particular adhesive bands, may be used for the wrapping. The fibers are, in particular, glass fibers, basalt fibers or carbon fibers.

Preferably, at least one media interface is arranged in the first pressure-plate arrangement and/or in the second pressure-plate arrangement. The media interface serves to exchange at least one gaseous or liquid medium between the stack and the environment. For example, if the stack is designed as a fuel-cell stack, the fuel, the oxidizing agent and the coolant must be exchanged beyond the housing. Battery stacks are also often cooled by means of a coolant.

In the wrapping of the housing in a fiber-reinforced plastic, it is advantageously ensured that the media interface is not covered by the wrapping. Particularly preferably, it is provided that two separate media interfaces are realized in at least one pressure-plate arrangement, the wrapping running between the two media interfaces.

The invention furthermore comprises an energy supply unit, comprising the described housing and the described stack. The energy supply unit is advantageously used in a vehicle. Also in the context of the energy supply unit, it is preferably provided that two tie-rod plates are used, which act both as tie rods and as housing structural parts. The two tie-rod plates therefore form two sides of the housing, and are connected to the two pressure-plate arrangements so as to maintain a bracing force upon the stack.

The advantageous designs described in the context of the method disclosed here and the dependent claims are, advantageously, correspondingly applicable to the energy supply unit. Conversely, the advantageous designs described in the following and the dependent claims of the energy supply unit are, advantageously, correspondingly applicable to the method.

Thus, in particular, it is also provided in the case of the energy supply unit that at least the first pressure-plate arrangement is materially bonded to the two tie-rod plates. Here also, in particular, the longest possible seam length is ensured, in order on the one hand to provide a secure connection between the tie-rod plates and the pressure-plate arrangements, and on the other hand to close the housing in a media-tight, or at least fluid-tight, manner at this point.

The stacks may vary in their length, i.e., the distance between the two pressure-plate arrangements, for production reasons. In order to compensate these variations, it is provided that at least one pressure-plate arrangement comprises a tolerance compensation system. The media interfaces are advantageously arranged in the first pressure-plate arrangement. It is therefore preferably provided that the tolerance compensation system is realized in the second pressure-plate arrangement.

In a relatively simple design of the tolerance compensation system, the corresponding pressure-plate arrangement, in particular the second pressure-plate arrangement, comprises an end plate and a tolerance compensation element, preferably realized as a tolerance compensation plate. The end plate is securely connected to the two tie-rod plates. The tolerance compensation element is located between the end plate and the stack. Before the stack is mounted in the housing, the stack is measured, and an appropriate tolerance compensation element, preferably a tolerance compensation plate having the appropriate wall thickness, is selected and mounted in the housing, in order thus to compensate the variations of the stack that are due to production.

Instead of, or in addition to, the tolerance compensation plate, at least one wedge-shaped element and/or a strip may also be inserted as a tolerance compensation element between the end plate and the stack.

Fastening of the pressure-plate arrangements to the two tie-rod plates is effected before and/or during maintenance of the bracing force. Subsequent tolerance compensation systems are actuated, in particular, after the two tie-rod plates have been securely connected to the two pressure-plate arrangements, such that the bracing force can be adjusted by the tolerance compensation system.

It is thus provided that, for tolerance compensation, the corresponding pressure-plate arrangement, in particular the second pressure-plate arrangement, comprises an end plate that is securely connected to the tie-rod plates, and a contact-pressure plate that is arranged between the end plate and the stack. The distance between the end plate and the contact-pressure plate in this case can be altered by at least one positioning arrangement.

It is provided, particularly preferably, that the positioning arrangement can be actuated from the outside, i.e., through one of the tie-rod plates and/or through the pressure-plate arrangement, in particular the end plate. It is thereby possible to mount the stack in the housing and to effect the corresponding tolerance compensation, by the positioning arrangement, only after the housing has been closed.

The use of the positioning arrangement may also be combined with the tolerance compensation element described above, in which case, in particular, coarse variations are compensated by the tolerance compensation element, and the positioning arrangement is actuated after the housing has been assembled.

In addition, the tolerance compensation elements may have resilient properties, in order to compensate longitudinal variations of the stack that are due to operation or service life.

It is preferably provided that the positioning arrangement comprises at least one screw, wherein the contact-pressure plate is supported on the end plate by means of the screw. In particular, the screw can be actuated from the outside, through a simple cutout in the pressure-plate arrangement, preferably in the end plate.

As an alternative to the screw, an eccentric may also be used as a positioning arrangement, between the contact-pressure plate and the end plate. In particular, the eccentric can be rotated from the outside by an appropriate tool, in order thus to alter the distance.

It is furthermore preferably provided that the positioning arrangement comprises a free space between the contact-pressure plate and the end plate, wherein a hardenable material can be injected into the free space. In particular, at least one access is provided in the pressure-plate arrangement, preferably in the end plate, and/or in the tie-rod plates, through which the corresponding material can be injected. In particular, liquid or viscous plastic is injected, which then hardens in the free space and thereby fixes the distance between the end plate and the contact-pressure plate.

The distance between the end plate and the contact-pressure plate can be set by the injection of the material into the free space. Provided for this purpose, in particular, is a cylinder/piston system, wherein the material is injected into the cylinder and the piston moves as a result. The piston in turn moves the contact-pressure plate. After the material has hardened, the cylinder is filled with the material, such that the piston can no longer move back. The material may be a thermoplastic or a thermoset. Thermosets in this context also include adhesives. It is also possible to use foam-type materials.

In the case of an alternative design, the free space for injection of the hardenable material is located between the end plate and the contact-pressure plate, but outside the cylinder/piston system. The piston, and thus the contact-pressure plate, is moved via at least one corresponding access.

This is preferably effected either by hydraulic pressure or by a corresponding tool that is inserted via the access. The hardenable material is injected into the free space via a further access in order to fix the set distance.

It is furthermore preferably provided that the distance between the end plate and the contact-pressure plate is set by the screw described above, the eccentric or another method, and then the material is injected into the free space in order to fix the distance.

Advantageously, there are current collectors located between the pressure-plate arrangements and the stack. Insulation layers or insulation plates for electrical insulation are advantageously arranged outside the current collectors in the pressure-plate arrangements.

Advantageously, the pressure-plate arrangements are composed of metal or a hybrid material. The pressure-plate arrangements may preferably be produced as extruded parts, milled parts, cast parts or injection molded parts.

It is preferably provided that at least one of the two tie-rod plates is fabricated from metal. In particular, a metal plate is used to produce the tie-rod plates.

It is additionally preferably provided that one of the two tie-rod plates or both tie-rod plates are fabricated from plastic. In particular, the plastic in this case is fiber-reinforced plastic. Particularly preferably, the main direction of the fibers runs in the longitudinal direction, i.e., from one end face to the other. The fibers in the tie-rod plates thereby act as tie rods.

Both the metal tie-rod plates and the tie-rod plates made from plastic are advantageously fabricated as a single piece. Preferably, the tie rods have an insulating material fitted on one side, in order to ensure the insulation between the housing and active cells. Preferably, the insulation is realized such that it compensates tolerances of the cell stacking process and of the cells.

Advantageously, the tie-rod plates or pressure plates that are made from plastic are provided with an EMC coating.

As described at the outset, the housing is designed, in particular, for a rectangular stack. The two large congruent surfaces of the rectangular shape are designated as the top side and the bottom side. The pressure-plate arrangements are located at the two opposing end faces. The two remaining surfaces are designated as opposing longitudinal sides.

It is advantageously provided that the first tie-rod plate covers the surface area of the top side, and the second tie-rod plate covers the surface area of the bottom side, over at least 50%, preferably at least 80%, particularly preferably 100% in each case. In particular, if the media interfaces are realized in the pressure-plate arrangement, there is no need for any connections on the top side and on the bottom side, such that, in this case, the top side and the bottom side can be completely covered by the tie-rod plates.

Within the housing, advantageously, at least two conductor rails lead from the plate-type current collectors to one of the two longitudinal sides. The two conductor rails can be contacted on this longitudinal side, and a corresponding cover can be fastened to the surrounding housing parts.

In a further embodiment, it is provided that the current collectors can be contacted, for example, by conductor rails, via the tie-rod side. If necessary, corresponding openings are provided for this purpose.

Moreover, it is also possible for the current collectors to be contacted through the pressure plates.

The opposing longitudinal side is also advantageously closed by a cover. Electronic components, for controlling and/or monitoring the stack and the connections necessary for this purpose, are advantageously arranged under this cover.

Furthermore, it is also possible for the tie rods to encompass the longitudinal sides and tightly enclose the fuel-cell stack. In this case, the connections for the electronic components can be made accessible via the tie-rod sides, for example, by openings.

It is preferably provided that a connection element runs on at least one edge of the housing. The connection element extends in the longitudinal direction and ends at one of the pressure-plate arrangements in each case. In particular, the connection element is securely connected to at least one of the two pressure-plate arrangements.

Particularly preferably, it is provided that the housing of the energy supply unit comprises four connection elements, one connection element being arranged at each edge of the rectangular form. The four connection elements are spaced apart from each other, such that, on the longitudinal sides of the rectangular housing, there is sufficient space between the two connection elements to run, for example, the current collectors.

The connection element is advantageously a rod-shaped element, for example, made of metal or plastic.

Preferably, the tie-rod plates lie on or bear against the connection element. In particular, the tie-rod plates are securely connected to the connection elements, in particular in a materially bonded manner. In particular, if a materially bonded connection is not selected, a seal is preferably provided between the tie-rod plates and the connection elements.

The described covers on the longitudinal sides of the housing are advantageously fastened to the connection elements. In particular, the covers are screw-connected or riveted to the connection elements. In order to ensure a media-tight, or at least fluid-tight, housing, it is preferably provided that a seal is arranged between the covers and the connection elements.

In a particularly preferred embodiment, as described above, four of the connection elements are used. Each connection element is securely connected to the second pressure-plate arrangement. The first pressure-plate arrangement has a respective guide portion on both sides. Each guide portion is arranged between two of the connection elements. The guide portions between the two connection elements enable the first pressure-plate arrangement to be guided in a linearly movable manner during assembly. After the housing has been closed, the two guide portions between the two connection elements constitute a form-fitting accommodation of the first pressure-plate arrangement.

The individual elements of the stack, i.e., the bipolar plates or the electrochemical elements, preferably each have at least one cutout. The cutouts of the individual elements are in alignment, such that the connection element can go through these cutouts. The at least one connection element in the cutouts enables the stack to be accommodated in a form-fitting manner with respect to the connection element.

Particularly preferably, the individual elements of the stack have cutouts at all four corners, the four connection elements going through the cutouts in the four corners.

The housing described here advantageously encloses the stack in a media-tight manner. Accordingly, seals are advantageously provided at all points that are not connected to each other in a materially bonded manner.

Furthermore, it is preferably provided that the described media interfaces in the corresponding pressure-plate arrangement are sealed. As described, the two longitudinal sides are advantageously closed by covers. These covers also are advantageously connected to the surrounding housing parts in a media-tight manner.

It is preferably provided that at least one fastening point, for attaching a holder, is arranged on at least one outer surface of the housing.

It is preferably provided that at least one device for pressure equalization, and/or for regulation of moisture between the housing interior and exterior, is arranged on the housing.

It is preferably provided that there is an opening, for applying bracing forces to the stack during the production process, at least on one pressure-plate side in the housing.

It is preferably provided that there is at least one access on the housing for introducing hardenable material.

It is preferably provided that at least one tie rod exerts an at least temporary force upon the stack.

Further details, features and advantages of the invention are disclosed by the following description and the figures.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 4 two views of the energy supply unit according to a variant of the exemplary embodiment.

DETAILED DESCRIPTION OF THE DRAWINGS

FIGS. 1 to 8 show an exemplary embodiment of an energy supply unit 1 produced according to the method. The energy supply unit 1 comprises a housing 2. Arranged in the housing 2 is a stack 3. In the example shown, the stack 3 is realized as a fuel-cell stack, and thus includes a plurality of bipolar plates stacked on one another. Alternatively, the stack 3 could also be realized as a battery stack having a plurality of stacked electromechanical cells.

The energy supply unit 1 is intended for use in a motor vehicle. In the motor vehicle, it serves to supply energy to an electric drive.

Figure 1:
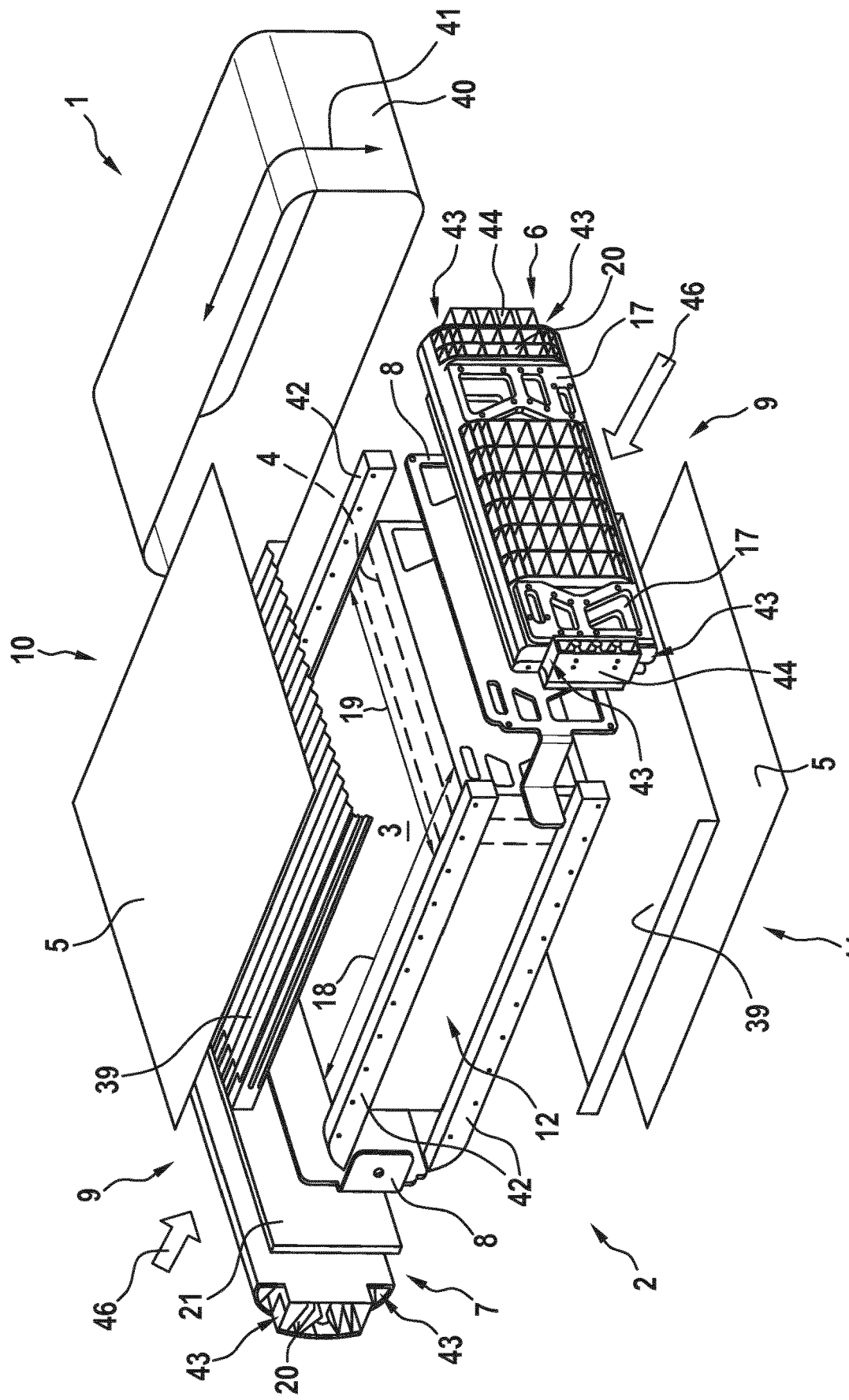
FIG. 1 an exploded representation of an energy supply unit according to an exemplary embodiment.
Figure 2:
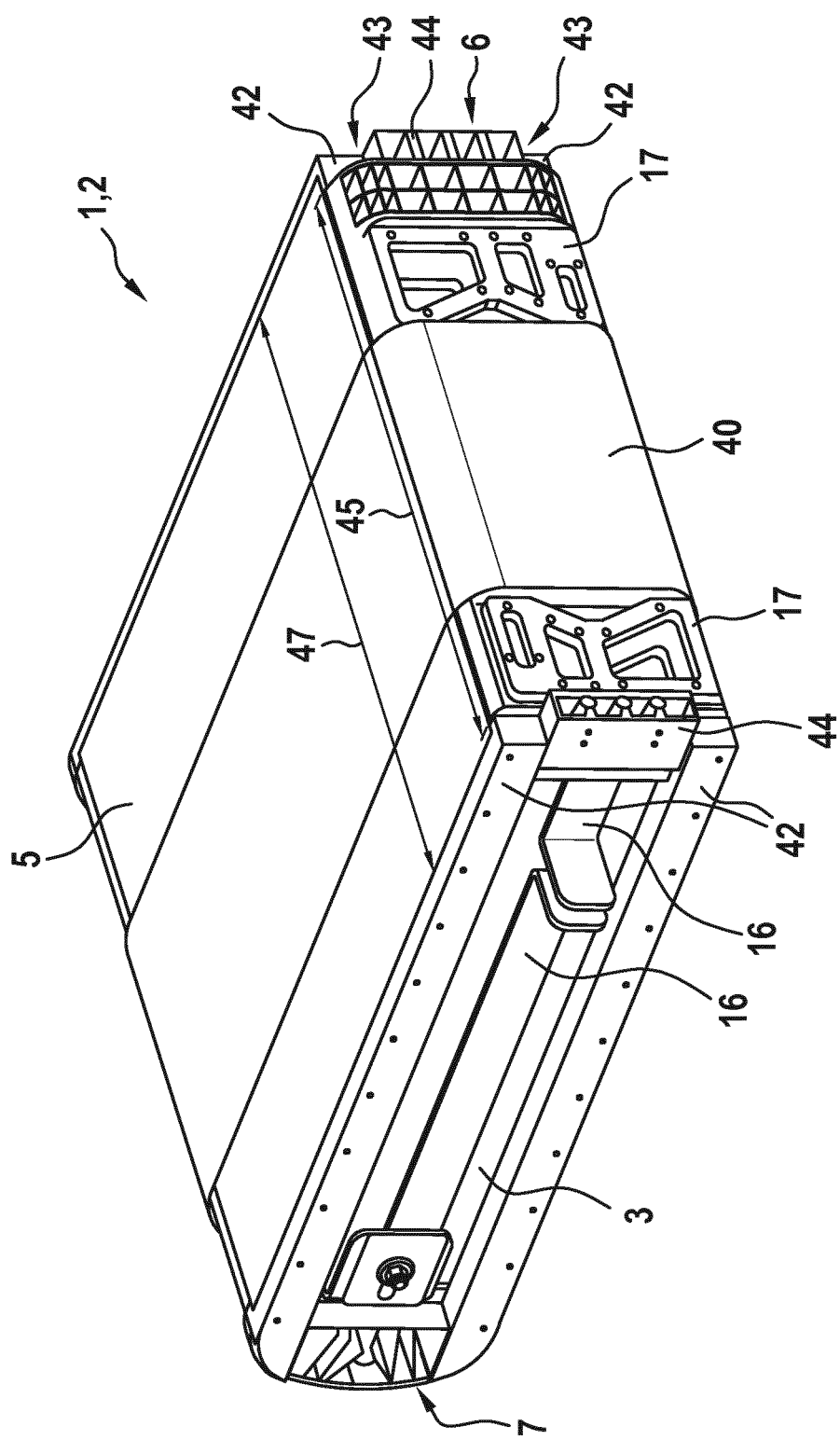
FIG. 2 a first perspective view of the energy supply unit according to the exemplary embodiment.
Figure 3:
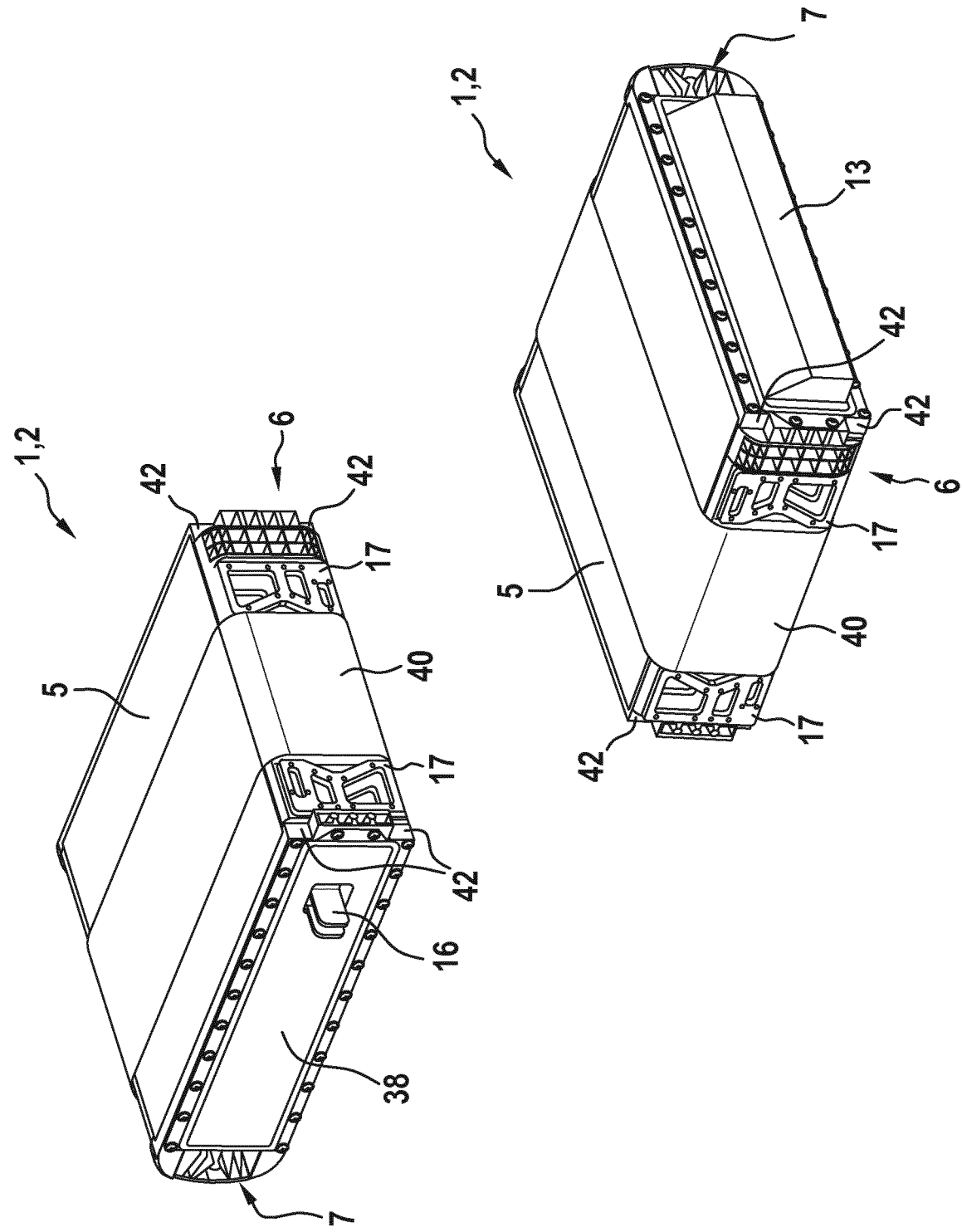
FIG. 3 two further perspective views of the energy supply unit according to the exemplary embodiment.

FIG. 1 shows an exploded representation of the energy supply unit 1. FIGS. 2 and 3 show views of the assembled energy supply unit 1.

The housing 2 comprises first and second tie-rod plates 5, and a first pressure-plate arrangement 6 and a second pressure-plate arrangement 7.

The stack 3 is arranged between the two tie-rod plates 5 and the two pressure-plate arrangements 6, 7. The stack 3 and the housing 2 are rectangular. Defined in accordance with the rectangular form are two opposing end faces 9, a top side 10, a bottom side 11 and two opposing longitudinal sides 12. The top side 10 and the bottom side 11 are the two largest congruent surfaces of the rectangular form.

The stack 3 has a length 18, a stack width 19 and a height 23. The individual bipolar plates 4 are arranged in succession along the length 19. The two pressure-plate arrangements 6, 7 are located at the end faces 9. A respective current collector 8 is positioned between the pressure-plate arrangements 6, 7 and the stack 3. The current collectors 8 correspond substantially to the size of a bipolar plate 4.

A respective insulation layer 39 for electrical insulation is preferably arranged between one of the tie-rod plates 5 and the stack 3. The insulation layer 39 is used, in particular, if the two tie-rod plates 5 are made of metal.

Respective connection elements 42 are arranged at the four edges of the housing 2. The connection elements 42 are in the form of bars and extend from one pressure-plate arrangement 6 to the other pressure-plate arrangement 7.

Each connection element 42 is securely connected to the second pressure-plate arrangement 7. The first pressure-plate arrangement 6 comprises two guide portions 44. At the two longitudinal sides 12, a guide portion 44 is in each case arranged between two connection elements 42.

In FIG. 1 a bracing force 46 is indicated by arrows. During production of the energy supply unit 1, the stack 3 is arranged between the two pressure-plate arrangements 6, 7. The first pressure-plate arrangement 6 is connected to the two tie-rod plates 5 in a materially bonded manner while the bracing force 46 is being applied to the pressure-plate arrangements 6, 7, and thus to the stack 3, by an external device. In this process a materially bonded, advantageously welded, seam is placed over a seam length 45.

It is provided that the second pressure-plate arrangement 7 is fastened to both tie-rod plates 5 before and/or during the application of the bracing force 46. The four connection elements 42 are also advantageously securely connected to the second pressure-plate arrangement 7 before and/or during the application of the bracing force 46.

After both pressure-plate arrangements 6, 7 have been securely connected to both tie-rod plates, fiber-reinforced plastic is advantageously wrapped around the housing 2, such that a wrapping 40 is produced. Advantageously, a band is used for this purpose. In the band, corresponding fibers are arranged in a plastic matrix. The band is advantageously wrapped several times around the housing 2. The band may also be an adhesive band having corresponding fibers.

The majority of the fibers, advantageously all fibers, in the wrapping 40 extend in the indicated fiber direction 41.

The first (upper) tie-rod plate 5 covers the entire top side 10 of the stack 3. The second (lower) tie-rod plate 5 covers the entire bottom side 11 of the stack 3. Depending on the design, small portions of the top side 10 or bottom side 11 may be covered by the connection elements 42. In this case, the tie-rod plates 5 do not cover 100% of the top side 10 or bottom side 11.

For the connections between the tie-rod plates 5 and the first pressure-plate arrangement 6, insofar as possible the entire stack width 19 is used, advantageously, for the seam length 45. In particular, the seam length 45 extends over at least 50% of the stack width 19. Advantageously a plate width 47 of the tie-rod plates 5 is also taken into account in this case, such that it can be defined that the seam length 45 preferably extends over at least 50%, in particular at least 70%, particularly preferably at least 80% of the plate width 47.

According to FIG. 3, a longitudinal side of the housing 2 is closed by a first cover 13. Electronic components, for example, for controlling and/or monitoring the stack 3, may be arranged under the cover 13.

As shown in particular by FIG. 2, conductor rails 16 are arranged on a longitudinal side 12. The conductor rails 16 are fabricated so as to be integral with the current collectors 8 or are connected to the current collectors 8. FIG. 3 shows that this longitudinal side 12 of the housing 2 is closed by a second cover 38.

The covers 13, 38 are in particular screwed onto the connection elements 42 and/or to the pressure-plate arrangements 6, 7.

According to FIGS. 1, 2 and 3, there are two media interfaces 17 realized on the first pressure-plate arrangement 6. These media interfaces 17 serve to exchange fuel (for example, hydrogen), oxidation means (for example, atmospheric oxygen) and coolant between the stack 3 and the environment.

Attachment points, for fastening the energy supply unit 1 to a higher-order structure, in particular the vehicle, are advantageously realized on the pressure-plate arrangements 6, 7.

Shown in two views in FIG. 4 is a variant of the first exemplary embodiment. For reasons of clarity, the first pressure-plate arrangement 6 is not visible here.

The individual elements of the stack 3 (in this case the bipolar plates 4) each have a cutout 43 at all four corners. The cutouts 43 are outwardly open pockets, and correspond in their geometry to the connection elements 42. The cutouts 43 of the individual elements are in alignment. Thus, in each case a connection element 42 runs in the cutouts 43 of a corner of the stack 3.

Owing to the use of the cutouts 43 and the connection elements 42, the stack 3 is supported, in a form-fitting manner with respect to the connection elements 42, in all directions parallel to the pressure-plate arrangements 6, 7.

FIGS. 5 to 8 show differing designs for a tolerance compensation system of the housing 2.

Figure 5:
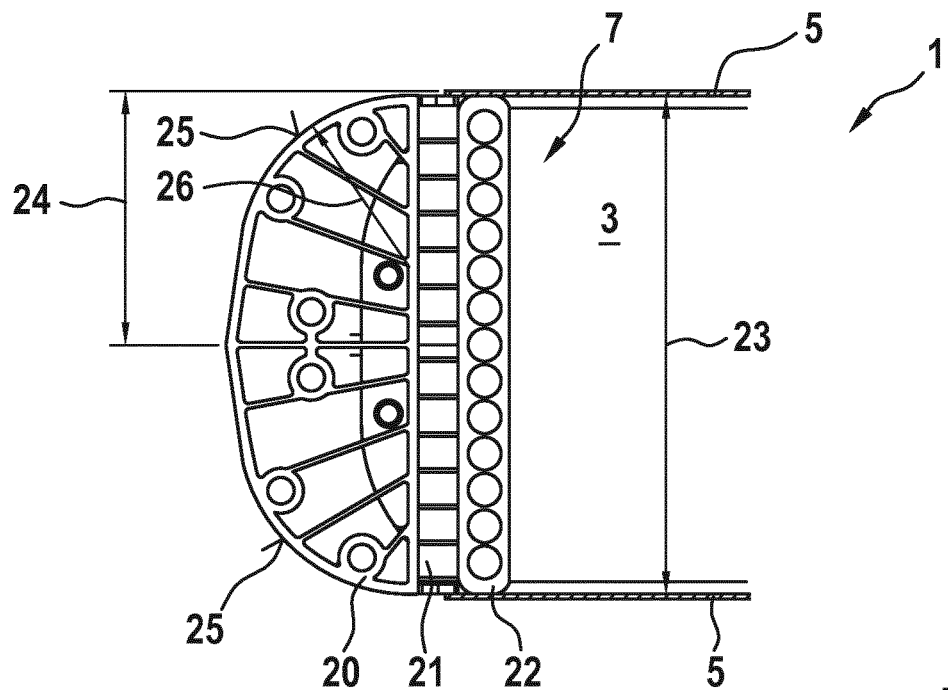
FIGS. 5 through 8 illustrate differing variants for a tolerance compensation system of the housing according to the exemplary embodiment.

According to FIG. 5, the second pressure-plate arrangement 7 includes an end plate 20. The two tie-rod plates 5 are fastened to the end plate 20. Between the end plate 20 and the stack 3 there is a tolerance compensation element, realized as a tolerance compensation plate 21. An insulation plate for electrical insulation may also be arranged between the tolerance compensation plate 21 and the end plate 20. Additionally or alternatively, the tolerance compensation plate 21 is realized as an insulation plate. Located between the tolerance compensation plate 21 and the stack 3 there is an inner pressure plate 22.

Before the stack 3 is mounted between the two tie-rod plates 5, the stack 3 is measured in respect of its length 18. The tolerance compensation plate 21 can be selected, in an appropriate wall thickness, according to this length 18. The tolerance compensation plate 21 in this case may also be composed of a plurality of individual plates. Other tolerance compensation elements may also be used in addition or as an alternative to the tolerance compensation plate 21.

Figure 6:
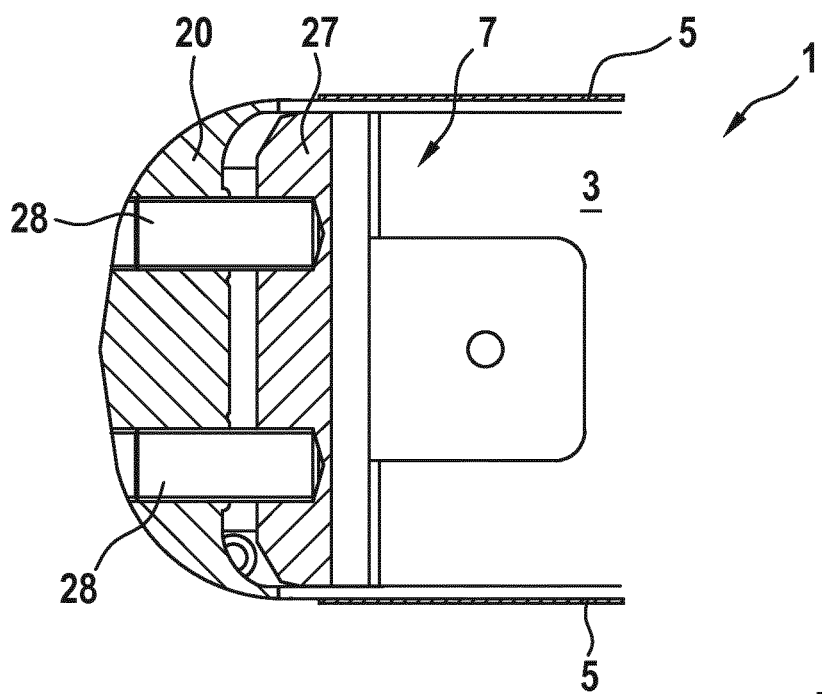

According to the variant in FIG. 6, the second pressure-plate arrangement 7 comprises a contact-pressure plate 27 in addition to the end plate 20. The contact-pressure plate 27 is located between the end plate 20 and the stack 3. The distance between the contact-pressure plate 27 and the end plate 20 is altered in this case by a suitable positioning means, also referred to as a positioning arrangement. These positioning means can preferably be actuated from outside the housing 2.

In the example according to FIG. 6, the positioning means is formed by screws 28. The screws 28 go into corresponding threads in the end plate 20 and in the contact-pressure plate 27. Rotation of the screws 27 alters the distance between the end plate 20 and the contact-pressure plate 27.

Figure 7:
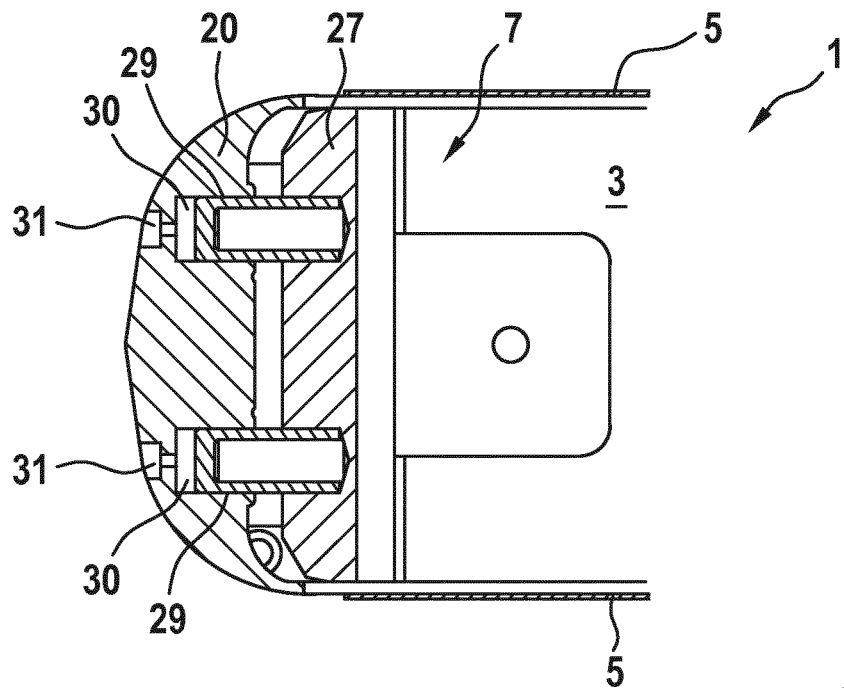

In FIG. 7, the positioning means is formed by a cylinder/piston system 30. Cylinders are cut out in the end plate 20.

Corresponding pistons are run in these cylinders. The pistons, in turn, are connected to the contact-pressure plate 27. The cylinders are accessible from the outside, via first accesses 31 in the end plate 20.

In this case it is provided, in particular, that a hardenable material, for example, plastic in a liquid form, is injected into the cylinders (designated as a free space 30 in FIG. 7) via the first accesses 31. As soon as the material inside the free space 30 has hardened, the position of the piston, and thus the position of the contact-pressure plate 27, is fixed.

Figure 8:
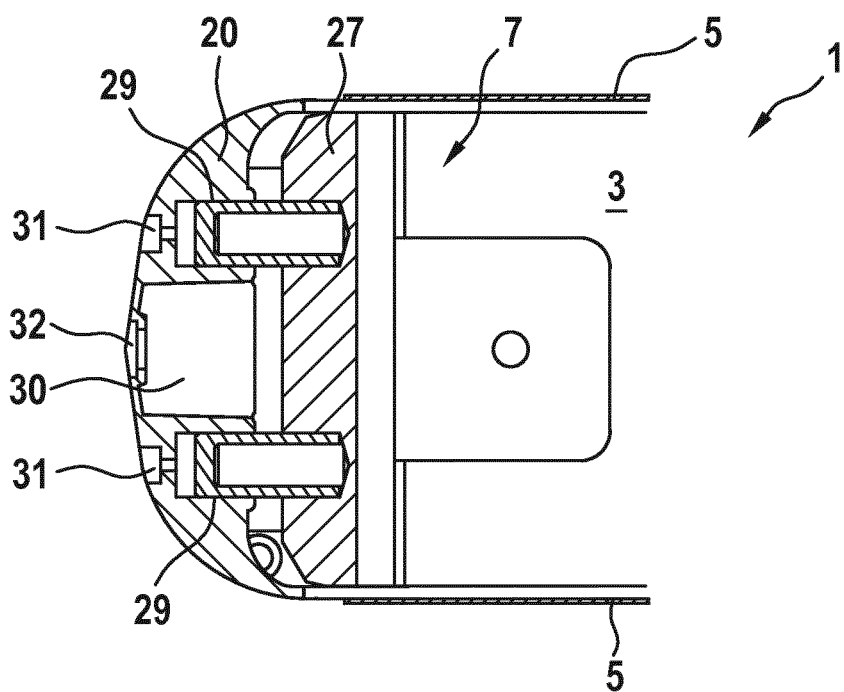

In FIG. 8, the free space 30 is likewise located between the end plate 20 and the contact-pressure plate 27, but outside the cylinder/piston system 29. The pistons, and thus the contact-pressure plate 27, are moved via the first accesses 31. This is effected either by a hydraulic pressure via the first accesses 31, or by a corresponding tool that is inserted via the first accesses 31. The hardenable material is injected into the free space 30 via a second access 32.

Within the invention it is provided, in particular, that the stack 3, within the tie-rod plates 5, does not include any tie rods of its own. Rather, the housing 2, with its two tie-rod plates, performs the function of the tie rods. In particular, in this case differing lengths 18 of the stack 3 can be taken into account by the tolerance compensation system described here.

Further preferred features of the invention are listed in the following:

In the case of the method, it is preferably provided that the second pressure-plate arrangement 7 is fastened to both tie-rod plates 5 before the application of the bracing force, or that the second pressure-plate arrangement 7 is fastened to both tie-rod plates 5 while the bracing force is being maintained upon the two pressure-plate arrangements 6, 7, or that the second pressure-plate arrangement 7 is fabricated so as to be integral with both tie-rod plates 5.

In the case of the method, it is preferably provided that at least one of the pressure-plate arrangement 6, 7 is connected to the tie-rod plates 5 in a non-destructively separable manner.

In the case of the method, it is preferably provided that at least the first pressure-plate arrangement 6 is connected to both tie-rod plates 5 in a materially bonded manner, preferably by welding, while the bracing force is being maintained upon the two pressure-plate arrangements 6, 7.

In the case of the method, it is preferably provided that the stack 3 has a stack width 19 parallel to the pressure-plate arrangements 6, 7, and the materially bonded connection between the first pressure-plate arrangement 6 and the two tie-rod plates 5 extends over a seam length 45, the seam length 45 being at least 50%, preferably at least 70%, particularly preferably at least 80% of the stack width 19.

In the case of the method, it is preferably provided that at least the first pressure-plate arrangement 6 is connected to both tie-rod plates 5 in a materially bonded manner, preferably by welding.

In the case of the energy supply unit, it is preferably provided that the stack 3 has a stack width 19 parallel to the pressure-plate arrangements 6, 7, and the materially bonded connection between the first pressure-plate arrangement 6 and the two tie-rod plates 5 extends over a seam length 45, the seam length 45 being at least 50%, preferably at least 70%, particularly preferably at least 80% of the stack width 19.

In the case of the energy supply unit, it is preferably provided that the stack 3 is of a rectangular design, the two large congruent surfaces of the rectangular form being designated as the top side 10 and the bottom side 11, the first tie-rod plate 5 covering the surface area of the top side 10, and the second tie-rod plate 5 covering the surface area of the bottom side 11, over at least 50%, preferably at least 80%, particularly preferably 100%.

In the case of the energy supply unit, it is preferably provided that at least one fastening point, for attaching a holder, is provided on an outer surface of the housing 2.

In the case of the energy supply unit, it is preferably provided that at least one device for pressure equalization, and/or for regulation of moisture between the housing interior and exterior, is arranged on the housing 2.

In the case of the energy supply unit, it is preferably provided that there is an opening, for applying bracing forces to the stack 3 during the production process, at least on one pressure-plate side in the housing 2.

In the case of the energy supply unit, it is preferably provided that the housing 2 is wrapped in a fiber-reinforced plastic, the wrapping 40 being laid around both tie-rod plates 5 and around both pressure-plate arrangements 6, 7.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCES 1 energy supply unit
2 housing
3 stack, realized as fuel-cell stack or battery stack
4 bipolar plates
5 first and second tie-rod plate
6 first pressure-plate arrangement
7 second pressure-plate arrangement
8 current collector
9 end faces
10 top side
11 bottom side
12 longitudinal sides
13 first cover
16 conductor rails
17 media interface
18 length
19 stack width
20 end plate
21 insulation plate and tolerance compensation plate
22 inner pressure plate
23 height
27 contact-pressure plate
28 screws
29 cylinder/piston system
30 free space
31 first access
32 second access
38 second cover
39 insulation layers
40 wrapping
41 fiber direction
42 connection elements
43 cutouts
44 guide portions
45 seam length
46 bracing force
47 plate width

What is claimed is:

1. A method for producing an energy supply unit having a housing and a stack, including a fuel-cell stack, battery stack or capacitor stack, arranged in the housing, the method comprising:
    providing the housing, including a first tie-rod plate, a second tie-rod plate, a first pressure-plate arrangement and a second pressure-plate arrangement, wherein each pressure-plate arrangement is fastened to each tie-rod plate,
    arranging the stack between the first and second tie-rod plates and between the first and second pressure-plate arrangements,
    applying a bracing force to the first and second pressure-plate arrangements for the purpose of bracing the stack, and
    fastening at least the first pressure-plate arrangement to both tie-rod plates while the bracing force is being maintained upon the first and second pressure-plate arrangements,
    wherein at least one of the first and second pressure-plate arrangements includes a tolerance compensation system, wherein the tolerance compensation system includes an end plate to be securely connected to the tie-rod plates, a contact-pressure plate arranged between the end plate and the stack, and a positioning arrangement,
    wherein a distance between the end plate and the contact-pressure plate is altered by the positioning arrangement,
    wherein the positioning arrangement includes a free space between the contact-pressure plate and the end plate, and wherein a hardenable material is injected into the free space.

2. The method as claimed in claim 1, wherein the positioning arrangement is actuated for the purpose of altering the distance between the end plate and the contact-pressure plate after the first and second tie-rod plates have been securely connected to the first and second pressure-plate arrangements.

3. The method as claimed in claim 1, wherein, for the purpose of altering the distance between the end plate and the contact-pressure plate, the positioning arrangement is actuated from outside, through at least one of the first and second tie-rod plates and the first and second pressure-plate arrangements.

4. The method as claimed in claim 1, wherein the positioning arrangement comprises a screw, and wherein the contact-pressure plate is supported on the end plate by means of the screw.

5. The method as claimed in claim 1, wherein an eccentric is used as the positioning arrangement, between the contact-pressure plate and the end plate.

6. The method as claimed in claim 1, wherein a cylinder/piston system is provided, wherein the hardenable material is injected into the cylinder and the piston moves as a result, wherein the piston moves the contact-pressure plate.

7. The method as claimed in claim 1, wherein a cylinder/piston system is provided and the free space is located outside the cylinder/piston system, and wherein the contact-pressure plate is moved by the piston and the hardenable material is injected into the free space.

8. The method as claimed in claim 1, wherein the housing is wrapped in a fiber-reinforced plastic, wherein the wrapping is laid around the first and second tie-rod plates and around the first and second pressure-plate arrangements.

9. The method as claimed in claim 2, wherein, for the purpose of altering the distance between the end plate and the contact-pressure plate, the positioning arrangement is actuated from outside, through at least one of the first and second tie-rod plates and the first and second pressure-plate arrangements.

10. The method as claimed in claim 2, wherein the positioning arrangement comprises a screw, and wherein the contact-pressure plate is supported on the end plate by means of the screw.

11. The method as claimed in claim 2, wherein an eccentric is used as the positioning arrangement, between the contact-pressure plate and the end plate.

12. The method as claimed in claim 2, wherein a cylinder/piston system is provided, wherein the hardenable material is injected into the cylinder and the piston moves as a result, wherein the piston moves the contact-pressure plate.

13. The method as claimed in claim 2, wherein a cylinder/piston system is provided and the free space is located outside the cylinder/piston system, and wherein the contact-pressure plate is moved by the piston and the hardenable material is injected into the free space.

14. The method as claimed in claim 2, wherein the housing is wrapped in a fiber-reinforced plastic, wherein the wrapping is laid around the first and second tie-rod plates and around the first and second pressure-plate arrangements.

15. The method as claimed in claim 3, wherein the housing is wrapped in a fiber-reinforced plastic, wherein the wrapping is laid around the first and second tie-rod plates and around the first and second pressure-plate arrangements.

16. An energy supply unit for a vehicle, comprising:
    a housing having a first tie-rod plate, a second tie-rod plate, a first pressure-plate arrangement and a second pressure-plate arrangement, wherein the first and second tie-rod plates and the first and second pressure-plate arrangements form four sides of the housing,
    a stack arranged in the housing and realized as a fuel-cell stack, battery stack or capacitor stack, between the first and second tie-rod plates and between the first and second pressure-plate arrangements,
    wherein the first and second pressure-plate arrangements are fastened to the first and second tie-rod plates in order to maintain a bracing force upon the stack,
    wherein at least one of the first and second pressure-plate arrangements includes a tolerance compensation system, wherein the tolerance compensation system includes an end plate, which is securely connected to the first and second tie-rod plates, a contact-pressure plate arranged between the end plate and the stack, and a positioning arrangement,
    wherein a distance between the end plate and the contact-pressure plate can be altered by the positioning arrangement,
    wherein the positioning arrangement includes a free space between the contact-pressure plate and the end plate, and wherein a hardenable material is injected into the free space.

17. The energy supply unit as claimed in claim 16, wherein, for the purpose of altering the distance between the end plate and the contact-pressure plate, the positioning arrangement can be actuated from the outside, through at least one of the first and second tie-rod plates and the first and second pressure-plate arrangements.

18. The energy supply unit as claimed in claim 16, wherein the positioning arrangement comprises a screw, and wherein the contact-pressure plate is supported on the end plate by the screw, and/or wherein an eccentric is used as a positioning arrangement between the contact-pressure plate and the end plate.

19. The energy supply unit as claimed in claim 16, wherein a cylinder/piston system is provided, wherein the hardenable material is injected into the cylinder in order to move the cylinder, wherein the piston moves the contact-pressure plate.

20. The energy supply unit as claimed in claim 16, wherein a cylinder/piston system is provided and the free space is located outside the cylinder/piston system, and wherein the contact-pressure plate can be moved by the piston and the hardenable material is injected into the free space.

\* \* \* \* \*